(No Model.)
H. E. WRIGHT & E. ENGELN.
IRONING BOARD.
No. 269,495. Patented Dec. 19, 1882.
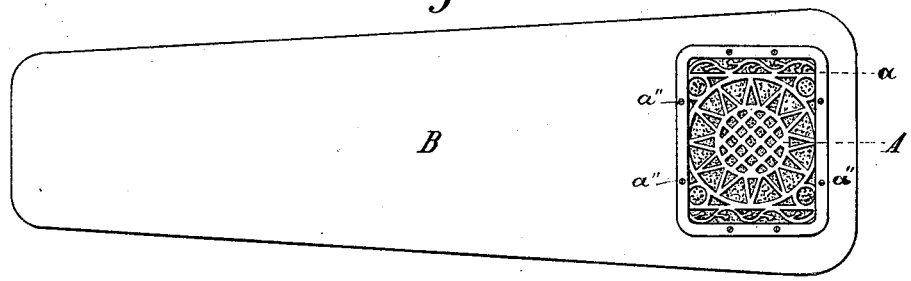
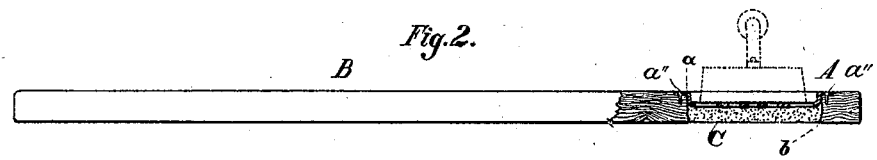
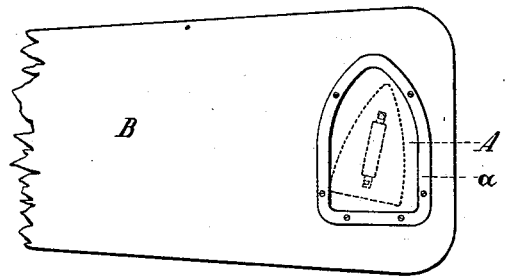
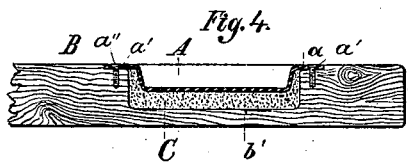
Attest
Carl Spengel
[signature]
Inventors:
Heloise E. Wright
Emelie Engeln
By Knight Bros.
Att'ys

UNITED STATES PATENT OFFICE.

HELOISE E. WRIGHT AND EMELIE ENGELN, OF CINCINNATI, OHIO.

IRONING-BOARD.

SPECIFICATION forming part of Letters Patent No. 269,495, dated December 19, 1882.

Application filed May 10, 1882. (No model.)

*To all whom it may concern:*

Be it known that we, HELOISE E. WRIGHT and EMELIE ENGELN, both of Cincinnati, Hamilton county, Ohio, have invented a new and useful Improvement in Ironing-Boards, of which the following is a specification.

Our invention relates to an ironing-board in which a holder or receptacle is employed for receiving the smoothing-iron; and it consists in combining with the said receptacle or holder a non-conducting composition between the pan-bottom and the bottom of the cavity within which the receptacle or holder is placed.

In the accompanying drawings, Figure 1 is a top view of our improved ironing-board. Fig. 2 is an edge view, partly in section. Fig. 3 is a top view, showing a closed holder or receptacle. Fig. 4 is a longitudinal section thereof.

A is a shallow pan or tray, constituting the well or iron-holder attachment proper. This attachment is of metal, preferably of cast-iron, as in Fig. 4. It has preferably a marginal flange or brim, $a$, having orifices $a'$ for wood-screws $a''$ wherewith to attach it to the board B. The said pan or attachment may be of rectangular oblong form, as in Fig. 1, or of any other form—such, for example, as that shown in Fig. 3—and the bottom may be perforate, as in Figs. 1 and 2, or imperforate, as in Figs. 3 and 4.

The board is so excavated, as shown, as to receive the pan A flush with its top, the excavation either going clear through, as at $b$, Fig. 2, or constituting a simple cavity, as at $b'$, Fig. 4, plaster-of-paris C or other refractory non-conductor being introduced beneath the pan-bottom.

We claim as new and of our invention—

The non-conducting material $b'$, located beneath the holder or receptacle and in combination therewith and with an ironing-board, as set forth.

In testimony of which invention we hereunto set our hands.

HELOISE E. WRIGHT.
EMELIE ENGELN.

Attest:
GEO. H. KNIGHT,
SAML. S. CARPENTER.